UNITED STATES PATENT OFFICE.

ETIENNE DE MEEUS, OF BEACON FALLS, CONNECTICUT, ASSIGNOR, BY MESNE ASSIGN-MENTS, TO THE BEACON FALLS RUBBER SHOE COMPANY, OF BOSTON, MASSACHU-SETTS, A CORPORATION OF MASSACHUSETTS.

VULCANIZED RUBBER AND PROCESS OF PRODUCING THE SAME.

1,229,724.     Specification of Letters Patent.     Patented June 12, 1917.

No Drawing.     Application filed July 10, 1914. Serial No. 850,163.

*To all whom it may concern:*

Be it known that I, ETIENNE DE MEEUS, a citizen of France, residing in Beacon Falls, in the county of New Haven and State of Connecticut, United States of America, have invented certain new and useful Improvements in Vulcanized Rubber and Processes of Producing the Same, of which the following is a specification.

This invention relates to a process of vulcanizing rubber, and to the vulcanized rubber product.

There has been found to be a difference in the behavior of rubber and sulfur under different methods of treatment. In carrying out vulcanization in heated molds and in steam, little if any difficulty is encountered in bringing about a chemical combination between the rubber and sulfur.

In carrying out vulcanization in "dry heat"—air, carbon dioxid, or other similar relatively inert gas—it is not ordinarily possible to bring about a chemical combination of the rubber and sulfur at ordinary vulcanizing temperatures and within the ordinary periods of time.

Furthermore, it is frequently desirable, in carrying out the vulcanization by the wet process (steam) to hasten, and otherwise promote, the action.

For the purpose of rendering feasible the carrying out of vulcanization by the dry method, and hastening and otherwise promoting, vulcanization by the wet process, it has been customary to employ substances with the rubber and sulfur, known as accelerators or adjuvants.

Lead monoxid or litharge has most generally been employed as an accelerator. Other substances have been employed as accelerators, these being mostly of an inorganic nature.

According to the present invention, an organic substance is employed as an accelerator.

I have found that there are many striking advantages attendant upon the use of an organic substance—and particularly the organic substances comprised within the present invention—as accelerators.

Some of the more important advantages that may be mentioned are that many of the organic substances comprised within the present invention bring about a quicker and more complete action between the rubber and sulfur than litharge, which is commonly understood to be the best substance for this purpose. The rapidity of the process has an effect upon the vulcanized rubber produced. Heat has a detrimental effect upon the crude rubber. The quicker the vulcanization can be effected, the less will be the degree of the detrimental effect of the heat. Consequently, a tougher and "livelier" vulcanized rubber may be produced.

Inorganic substances used for accelerators have a greater density or specific gravity than water. Rubber has a less density or specific gravity than water, and vulcanized rubber—not containing inorganic accelerators or fillers of greater density than water, or a considerable amount of fillers which are of greater density than water,—is also of less density or specific gravity than water. Organic substances as a rule, have a less, or only slightly greater density or specific gravity than water. Furthermore, many of the present accelerators being of greater efficiency than inorganic substances need to be used in less amounts than inorganic substances. Consequently, vulcanized rubber articles may be readily produced by the use of organic substances as accelerators which are of less density or specific gravity than water.

I have further discovered that the use of organic substances as accelerators renders the regeneration of rubber a simpler matter, yielding a better quality of regenerated rubber.

Reactions occur between the sulfur and most of the inorganic substances used as accelerators, giving colored products. For instance, when litharge is used, lead sulfid is formed, which is black, as is well known. This fact considerably limits the use of inorganic substances used as accelerators, inasmuch as certain vulcanized rubber products are desired to have a certain color, or a natural color.

Organic substances of the classes employed by me have also been found to be generally of a reducing nature. This property is of advantage, inasmuch as oxidation of the rubber, which appears with some accelerators, is avoided.

From the foregoing it will be seen that organic substances widely extend the use of accelerators in the vulcanization of rubber.

While accelerators, and their action in promoting the combination of sulfur, have long been known, yet the nature of this action is but imperfectly understood, and renders somewhat difficult a setting forth of the essential nature of such substances.

The substances which I have found suitable for use as accelerators are aromatic compounds, containing one or more benzene or homologous groups, and of a basic nature. The substances may be further described as being of a basic nature, containing preferably two ammonia radicals or residues, or equivalents, i. e., a compound comprising one or more benzene groups in which preferably two of the hydrogens have been substituted by ammonia radicals or by one ammonia radical and an equivalent group or chain. Triphenylmethane bases and leucobases are included. The substances contain a true cyclic group though considered as a whole they may be of a hetro cyclic structure.

The following may be given as a typical formula:

The ortho, meta, and para structures are suitable, but the para constructions give decidedly the best results.

Examples of particular substances which have been found suitable as accelerators are as follows:—

Paraphenylenediamin,
Metaphenylenediamin,
Dimethylparaphenylenediamin chlorhydrate,
Dimethylanilin,
Methyl-violet base,
Victoria-green base,
Victoria-blue base,
Auramin O (anilin-yellow),
Rosanilin-base,
Methylene-blue.

Of the foregoing substances, paraphenylenediamin, having the formula

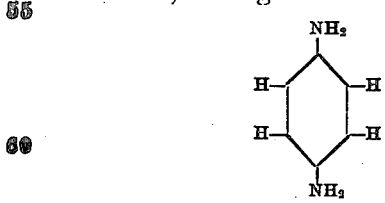

may be selected as most typical of the substances serving as accelerators, according to the present invention. Paraphenylenediamin has, in many respects, given the best results, having a very strong assisting action on the sulfur.

Victoria-green base is another substance which has given good results, and may be specifically mentioned as illustrating a substance containing more than one benzene group, and as having one of its hydrogens substituted by an ammonia derivative and another hydrogen substituted by a benzene group, the substance having the formula:

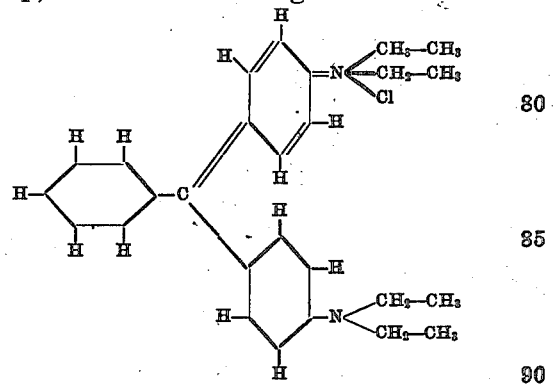

The foregoing substances and formulas have been given by way of example only, as there are many substances having the nature indicated herein, which will suggest themselves to the skilled chemist, which may be availed of for the purposes of the present invention.

In carrying out the process, the accelerator is added in suitable proportion to a mixture of rubber and sulfur, and containing or not, as may be desired, suitable fillers. The mass is then worked into form and subjected to a usual vulcanizing temperature for periods depending on the accelerator used and the extent to which it is desired to carry the vulcanization, these matters being well understood by those versed in the art of vulcanization.

A mixture which has been largely used comprises 90 parts para rubber, 3 parts sulfur and 5 parts paraphenylenediamin. A good vulcanization is attained in dry heat by heating the mixture for one hour at 135° C. (275° F).

The vulcanized rubber produced from mixtures in which any of the foregoing accelerators have been used, possesses superior qualities with respect to "liveliness", has a less density or specific gravity than water, and when regenerated yields a better product than is obtained by the use of accelerators which have heretofore been in use.

What is claimed is:—

1. The process of vulcanizing, comprising adding a base of the aromatic series to a mixture of rubber and sulfur, and heating.

2. The process of vulcanizing, comprising adding a base of the aromatic series of para construction to a mixture of rubber and sulfur, and heating.

3. The process of vulcanizing, comprising adding to a mixture of rubber and sulfur a substance of the aromatic series containing one or more benzene groups in which two of the hydrogens have been substituted by amins or an equivalent group or chain, and heating.

4. The process of vulcanizing, comprising adding to a mixture of rubber and sulfur, a base of the aromatic series in which the anilin function or radical is in position para, with another radical or with the atom of carbon or triphenylmethane, and heating.

5. The process of vulcanizing, comprising adding to a mixture of rubber and sulfur, one of the described aromatic accelerating substances or equivalents, and heating.

6. The process of vulcanizing, comprising adding to a mixture of rubber and sulfur, paraphenylenediamin, and heating.

7. Vulcanized rubber containing before vulcanization rubber and sulfur, and a base of the aromatic series.

8. Vulcanized rubber containing before vulcanization rubber and sulfur, and a base of the aromatic series of para construction.

9. Vulcanized rubber containing before vulcanization rubber and sulfur, and a substance of the aromatic series containing one or more benzene groups in which two of the hydrogens have been substituted by amins or an equivalent group or chain.

10. Vulcanized rubber containing before vulcanization rubber and sulfur, and an aromatic base in which the anilin function or radical is in position para with another radical or with the atom of carbon of triphenylmethane.

In witness whereof, I have hereunto signed my name in the presence of two subscribing witnesses.

ETIENNE DE MEEUS.

Witnesses:
GUSTAVE R. THOMPSON,
FRED WHITE.